United States Patent [19]

Greenwood

[11] 4,121,884
[45] Oct. 24, 1978

[54] OPTICAL FIBER SWITCH

[75] Inventor: John Christopher Greenwood, Harlow, England

[73] Assignee: International Standard Electric Corporation, New York, N.Y.

[21] Appl. No.: 731,055

[22] Filed: Oct. 8, 1976

[51] Int. Cl.² .............................................. G02B 5/14
[52] U.S. Cl. ..................... 350/96.15; 350/96.20; 350/96.29
[58] Field of Search ............. 350/96 C, 96 R, 96 LM, 350/96 WG, 96 B, 96.15, 96.20, 96.29

[56] References Cited

U.S. PATENT DOCUMENTS

| 3,466,565 | 9/1969 | Rigrod | 331/94.5 |
|---|---|---|---|
| 3,582,907 | 6/1971 | Taylor et al. | 350/96 R |
| 3,647,277 | 3/1972 | Kaminow | 350/96 GN |
| 3,841,731 | 10/1974 | Midwinter | 350/96 LM |
| 3,874,779 | 4/1975 | Thiel | 350/96 C |

FOREIGN PATENT DOCUMENTS

| 2,522,394 | 12/1975 | Fed. Rep. of Germany | 350/96 C |
|---|---|---|---|
| 1,438,961 | 6/1976 | United Kingdom | 350/96 LM |
| 1,377,551 | 12/1974 | United Kingdom | 350/96 LM |

Primary Examiner—John K. Corbin
Assistant Examiner—Stewart Levy
Attorney, Agent, or Firm—John T. O'Halloran; Peter C. Van Der Sluys

[57] ABSTRACT

An optical fiber switching arrangement contains a parallel-sided cell arranged within an optical fiber at an angle to the fiber axis. The arrangement includes means for introducing either a liquid or a vapor into the path of light passing through the cell. The cell is completely transparent to light when filled with liquid and is completely reflective to light when containing vapor.

2 Claims, 2 Drawing Figures

OPTICAL FIBER SWITCH

BACKGROUND OF THE INVENTION

This invention relates to optical switch devices, and in particular to an optical switch in which a fluid is employed to optically bridge a gap in an optical fiber or transmission line.

SUMMARY OF THE INVENTION

According to the invention there is provided an optical switch arrangement adapted to control light passing along a solid light guide, including a parallel-sided cell formed in the light guide, and means for filling the cell selectively with a liquid or the vapor of the liquid. The liquid has a refractive index similar to that of the light guide material so that the cell when filled is substantially transparent. The cell is arranged at an angle to the axis of the light guide such that, when the cell is filled with the vapor, it is totally internally reflective to light traveling parallel to the axis of the guide.

DESCRIPTION OF THE PREFERRED EMBODIMENT

Figure 1:
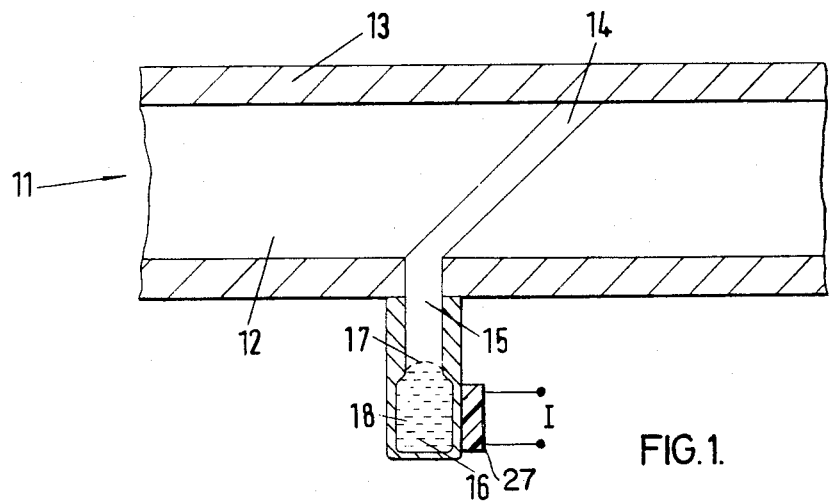
FIG. 1 is a sectional view of the fluid operated optical switch device of this invention.

Referring to FIG. 1, the switch device is formed in a portion of an optical fiber or light guide 11 which fiber has a core 12 and is advantageously provided with a cladding 13. A parallel-sided cell 14 is formed by a diagonal cut in the fiber core 12 and communicates via a passageway 15 through the fiber cladding 13 to a reservoir 16 containing a liquid 18. The portion of the cell 14 above the liquid meniscus 17 is filled with the liquid vapor. The liquid 18 has a refractive index similar to that of the fiber core 12 at the wavelengths at which the switch is intended to operate and, advantageously, has a comparatively large thermal volume coefficient of expansion.

When the cell 14 is filled with vapor, which has a refractive index substantially equal to unity, light traveling along the fiber 11 in either direction is totally internally reflected at the cell 14 i.e. the fiber is 'switched off'. If the cell 14 is then filled with the liquid 18, e.g. by heating the reservoir 16 thus causing the liquid 18 to expand, light is then permitted to pass along the fiber through the cell 14 in either direction, i.e. the fiber is 'switched on'.

The liquid 18 may be removed from the cell 14 by cooling the reservoir 16. This heating and cooling may be accomplished via a Peltier type heater/cooler 27 placed in thermal contact with the reservoir, or placed in the liquid. This device can employ a thermocouple junction which is heated or cooled depending on the direction of an electric current I passed through the device. Alternatively an electromechanical device may be used to control the liquid.

For most applications the cell 14 should be of sufficient width to prevent optical interference effects arising from diffraction and/or frustrated total internal reflection. In some embodiments, however, the cell 14 may be made sufficiently thin to operate as a Fabry-Perot etalon type filter which may be employed for duplex or multiplex switching of light signals of various wavelengths transmitted along the fiber.

Figure 2:
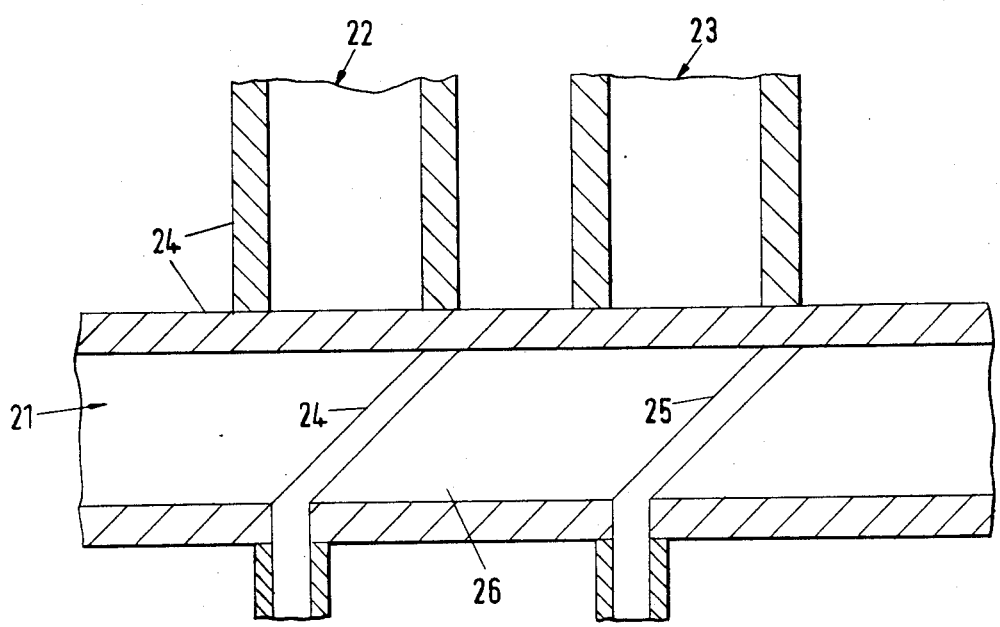
FIG. 2 is a sectional view of a switching matrix employing the switches of FIG. 1.

FIG. 2 is a schematic cross-section of part of a multi-way switch arrangement. Branch fibers 22 and 23 are placed in optical contact with a main fiber 21 and adjacent a respective liquid contacting reservoir 16 (FIG. 1) and can then be filled with liquid or vapor.

The cells 24 and 25 are each arranged at an angle of 45° to the axis of the main fiber 21 such that when either of the cells is filled with vapor having a low refractive index, light traveling along the fiber 21 from left to right is reflected along the corresponding branch fiber 22 or 23. For most applications the cells 24 and 25 should be relatively thick in comparison to the wavelength of the transmitted light to prevent diffraction as stated earlier. However, in some applications thin etalon cells may be used to demultiplex light of various wavelengths passing along the fiber 21, or to multiplex light signals from the branch fibers 22 and 23 into the main fiber 21. The arrangement shown in FIG. 2 is not of course limited to two switches. Thus further switches with or without attendant branch fibers may be added according to specific application.

In a further embodiment the reservoir and cell may be completely filled with a volatile liquid which at ambient temperature is near its boiling point. The cell is then switched by heating the liquid to cause vaporization and by cooling the vapor to recondense it to the liquid. In other applications the reservoirs may be provided with a wick or a body of absorbent material which reduces the effective vapor pressure of the liquid.

It is to be understood that the foregoing description of specific examples of this invention is made by way of example only and is not to be considered as a limitation on its scope.

What is claimed is:

1. An optical switch to control light passing along a solid state guide, comprising:
   a parallel-sided cell formed in a light guide at an angle to the axis of the light guide sufficient to cause internal reflection; and
   means for filling the cell selectively with a liquid, or the vapor of the liquid, said liquid having a refractive index similar to that of the light guide materials such that when the cell is filled with the liquid, the cell is substantially transparent to said light, and when the cell is filled with the vapor, the cell is totally internally reflective to said light said means for filling including a liquid containing reservoir communicating with the cell and having means for heating and cooling the liquid so as to expand or contract the liquid.

2. The switch of claim 1 wherein the heating or cooling means includes a Peltier type device fitted to the reservoir.